United States Patent
Van Straaten (10) Patent No.: US 7,162,836 B2
(45) Date of Patent: Jan. 16, 2007

(54) TEMPORARY STRUCTURE

(75) Inventor: Willem Johannes Van Straaten, Sandton (ZA)

(73) Assignee: Greenhouse International,LLC, Newark, DE (US)

( * ) Notice: Subject to any disclaimer, the term of this patent is extended or adjusted under 35 U.S.C. 154(b) by 404 days.

(21) Appl. No.: 10/501,476

(22) PCT Filed: Jan. 15, 2003

(86) PCT No.: PCT/ZA03/00006

§ 371 (c)(1),
(2), (4) Date: Jul. 14, 2004

(87) PCT Pub. No.: WO2004/063496

PCT Pub. Date: Jul. 29, 2004

(65) Prior Publication Data
US 2005/0081471 A1    Apr. 21, 2005

(51) Int. Cl.
E04B 1/34 (2006.01)
E04B 2/00 (2006.01)
E04G 11/04 (2006.01)
E04H 15/20 (2006.01)

(52) U.S. Cl. ............ 52/2.24; 52/2.18; 52/584.1
(58) Field of Classification Search ........... 52/2.18, 52/2.24, 584.1; 446/89, 112, 107, 120, 62; 24/462, 460, 461; 135/120.3
See application file for complete search history.

(56) References Cited

U.S. PATENT DOCUMENTS

| | | | | |
|---|---|---|---|---|
| 1,362,651 A | * | 12/1920 | Towns | 198/699 |
| 3,114,412 A | * | 12/1963 | Lishman | 160/348 |
| 3,141,221 A | * | 7/1964 | Faulls, Jr. | 24/30.5 R |
| 3,332,177 A | * | 7/1967 | Sepp | 52/2.19 |
| 3,744,501 A | * | 7/1973 | Kozarsky | 52/2.12 |
| 3,803,671 A | * | 4/1974 | Stuppy et al. | 24/460 |
| 3,816,885 A | * | 6/1974 | Saether | 24/462 |
| D274,213 S | * | 6/1984 | Omata | D8/356 |
| 4,653,716 A | * | 3/1987 | Sakaguchi | 248/316.5 |
| 4,709,430 A | * | 12/1987 | Nicoll | 5/417 |
| 4,759,518 A | * | 7/1988 | Yardas | 248/97 |
| 4,847,958 A | * | 7/1989 | Conley | 24/461 |
| 4,903,629 A | * | 2/1990 | Maudlin et al. | 114/361 |
| 4,907,637 A | * | 3/1990 | Hintsa | 160/368.1 |
| 5,182,827 A | * | 2/1993 | Carrier et al. | 5/498 |
| 5,371,925 A | * | 12/1994 | Sawatsky | 24/30.5 R |
| D355,351 S | * | 2/1995 | Clawson et al. | D8/356 |
| D387,652 S | * | 12/1997 | Carlson, Jr. | D8/356 |
| 5,752,297 A | * | 5/1998 | Ramey | 24/462 |

(Continued)

FOREIGN PATENT DOCUMENTS

CA    1 156 017    11/1983

(Continued)

Primary Examiner—Naoko Slack
Assistant Examiner—Hunter Dreidame
(74) Attorney, Agent, or Firm—Wenderoth, Lind & Ponack, L.L.P.

(57) ABSTRACT

A kit for building a structure which includes a plurality of panels (28, 30), each panel having at least one respective peripheral formation (34) and a plurality of fasteners (10); each fastener having at least two clip formations (12, 14), and wherein the clip formations of a fastener are respectively engageable with the peripheral formations of two of the panels which are positioned adjacent each other, to secure the panels together.

14 Claims, 6 Drawing Sheets

U.S. PATENT DOCUMENTS

D406,749 S * 3/1999 Selk ............................ D8/356
6,148,488 A * 11/2000 Gristock ...................... 24/462
6,393,639 B1 * 5/2002 Ohsner ......................... 5/425

FOREIGN PATENT DOCUMENTS

| CA | 1156017 | * | 11/1983 |
| EP | 0 306 717 A1 | | 8/1988 |
| EP | 0306717 A1 | * | 9/1988 |
| WO | 90/15208 | * | 12/1990 |

* cited by examiner

TEMPORARY STRUCTURE

BACKGROUND OF THE INVENTION

This invention relates generally to a temporary structure and to a kit for erecting or building a structure of this type. Although it is envisaged that the structure will be used mainly by children for building light-weight shelters, enclosures, or the like it is possible to make use of the principles of the invention in erecting more substantial structures for example to provide a shelter or shield against weather elements such as the sun, rain and wind. The kit can also be used for educational and motivational purposes by providing elements which can be assembled in imaginative, innovative ways to erect mazes and constructions of different shapes and sizes.

SUMMARY OF THE INVENTION

The invention provides a kit for building a structure which includes a plurality of panels, each panel having at least one respective peripheral formation and a plurality of fasteners, each fastener having at least two clip formations, and wherein the clip formations of a fastener are respectively engageable with the peripheral formations of two of the panels which are positioned adjacent each other, to secure the panels together.

Each panel may be made from a sheet material which preferably is flexible.

The peripheral formation of a panel may be formed by an inflatable section of the sheet material.

The inflatable section of a panel is preferably tubular and extends continuously along the periphery of the panel around an enclosed region of the sheet material.

The enclosed region, which may be a flat portion of the sheet material, may extend from the inflatable tubular section at any desired position eg. from a central position, substantially tangentially from the tubular section, or from any other desired position.

The clip formations of each respective fastener are preferably resiliently deformable.

In one embodiment, each fastener includes a bridging piece and the clip formations are opposing arcuate sections at respective ends of the bridging piece.

In a different embodiment, each fastener includes two arcuate sections which respectively form the clip formations, and each section is engageable with a respective peripheral formation of a panel.

Each arcuate section may extend along a substantial portion of a circular path through an angle in excess of 180°, and preferably through an angle of the order of 240°.

The arcuate sections may extend from a central region, at which the arcuate sections are connected to each other, which lies on a straight line which passes diametrically through the arcuate sections. Preferably the central region is substantially linear, ie. is not curved.

A mouth through which an inflated tubular section can be inserted into a clip formation may be defined between an end of the central region and an end of a respective arcuate section. The mouth may extend in an angular sense through about 120°.

The invention also extends to a panel for use in the aforementioned kit which includes a region of flexible sheet material and an inflatable tubular section of sheet material which extends around the region to form a continuous peripheral formation of the panel.

The panel may be square, rectangular or triangular in outline, or have any other suitable shape.

The invention also provides a fastener for use in the aforementioned kit which includes a body which is made from a resiliently deformable plastics material and which is formed with two arcuate sections which respectively define the clip formations. The fastener may be constructed in accordance with the aforementioned principles.

BRIEF DESCRIPTION OF THE DRAWINGS

The invention is further described by way of examples with reference to the accompanying drawings in which.

DESCRIPTION OF PREFERRED EMBODIMENTS

Figure 1:
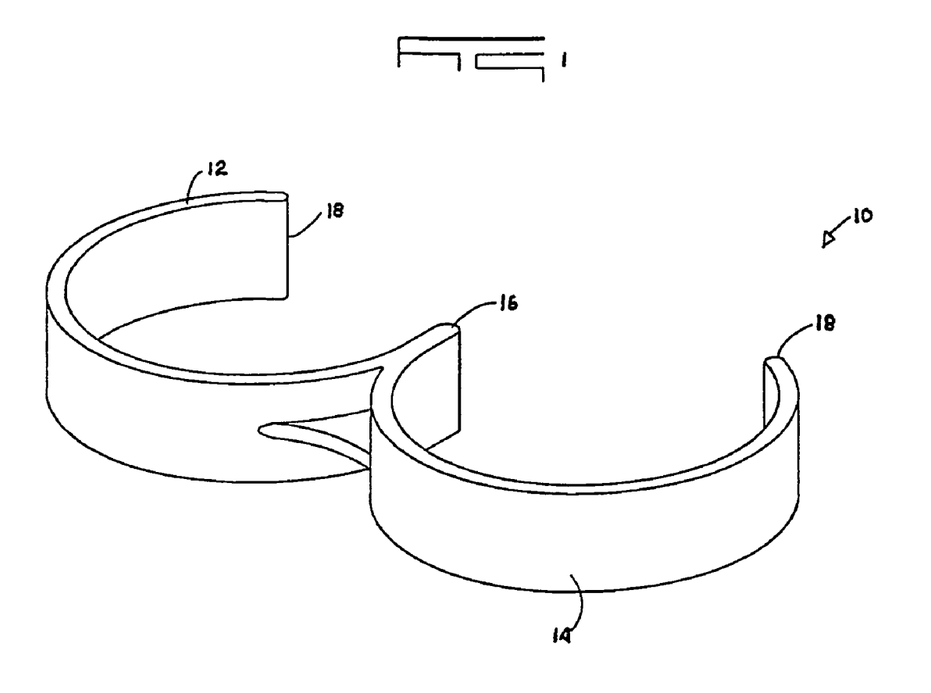
FIG. 1 is a perspective view of a fastener according to one form of the invention.
Figure 2:
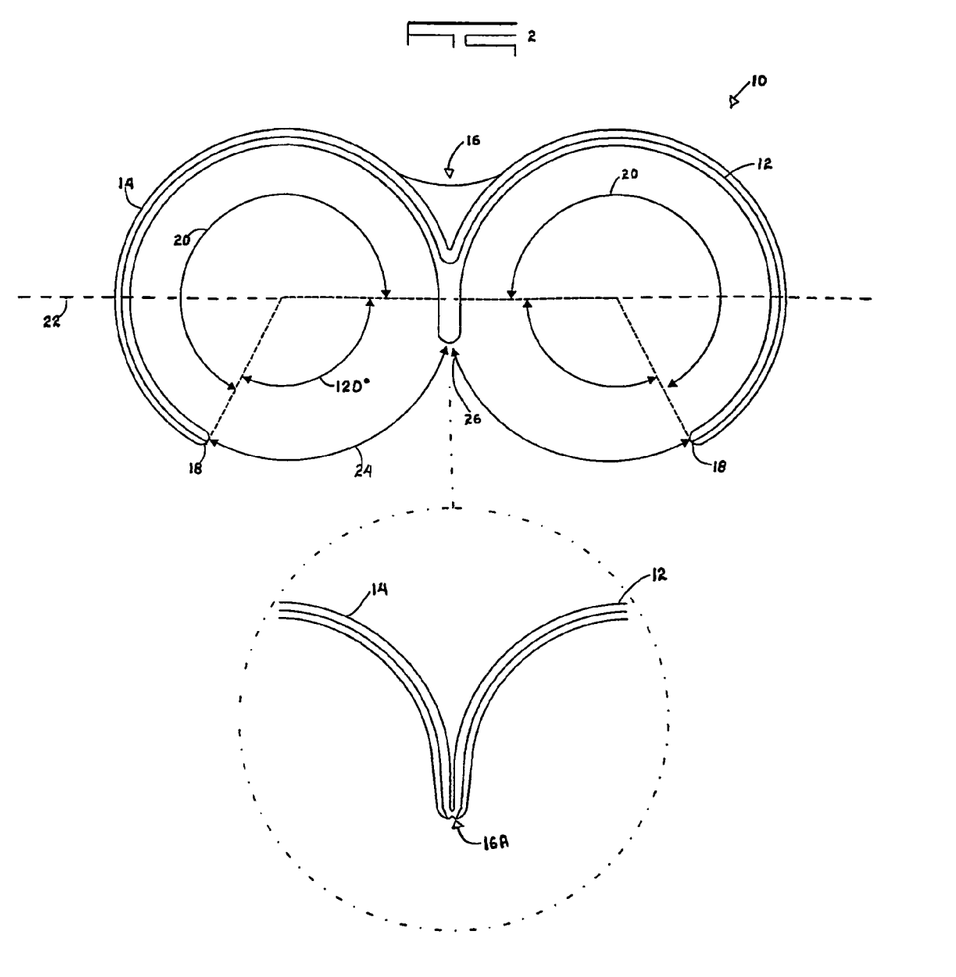
FIG. 2 is a plan view of the fastener of FIG. 1.

FIGS. 1 and 2 of the accompanying drawings respectively illustrate in perspective and plan a fastener 10 according to the invention which includes two arcuate sections 12 and 14 respectively which are joined together at a central region 16.

Each arcuate section is substantially C-shaped and has rounded ends 18. Each C-shaped section follows a circular path and extends through an angle 20 of approximately 240°.

The fastener 10 is made, eg. integrally moulded, from a suitable resiliently deformable plastics material such as polypropylene.

The central region 16 is linear, ie. not curved, and lies on a straight line 22 which passes diametrically through the arcuate sections 12 and 14.

A mouth 24 is defined between an end 26 of the central region and an end 18 of a respective arcuate section. The mouth extends in an angular sense through an angle which is slightly less than 120°.

Figures 3, 4:
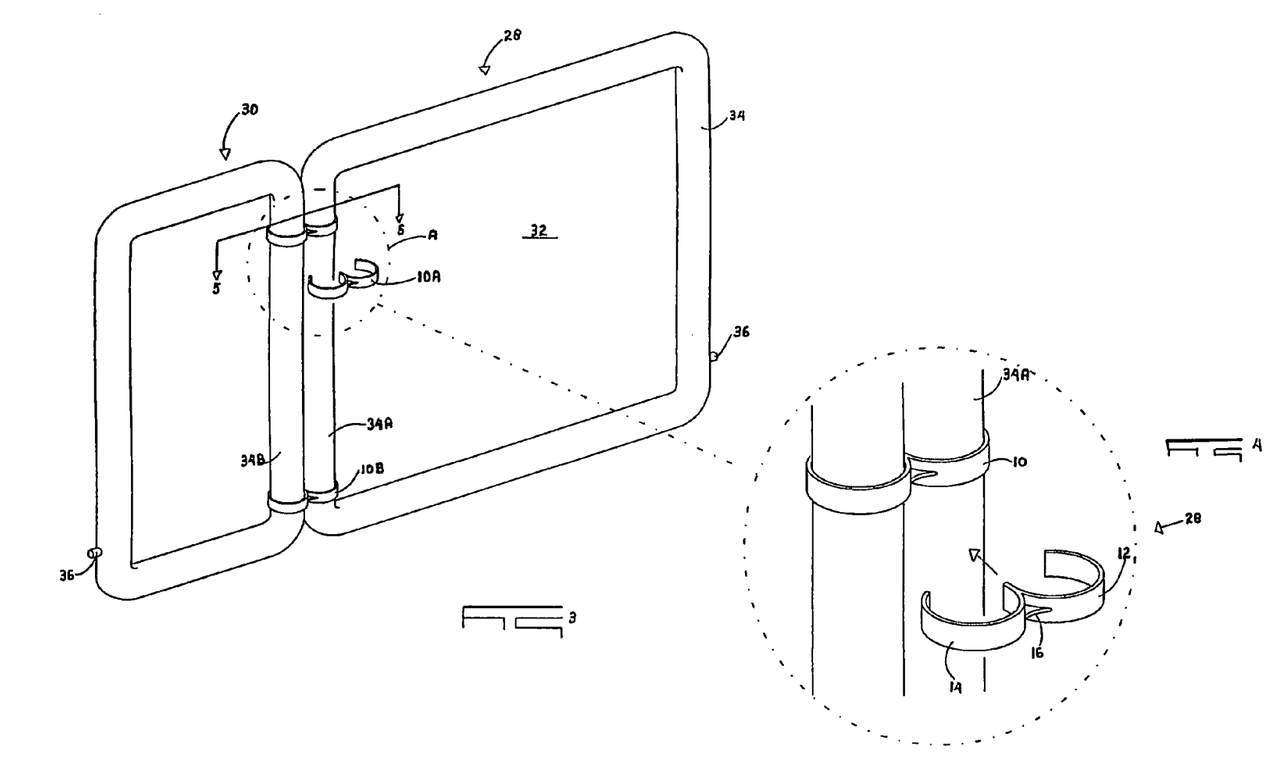
FIG. 3 is a perspective view of two interconnected panels which are included in a kit for building a structure according to the invention.
FIG. 4 is an enlarged view of a portion marked A of the arrangement in FIG. 3.

FIG. 3 illustrates two panels 28 and 30 respectively which are included in a building kit according to the invention. The panels can be made to any appropriate size and shape but, conveniently, are square, rectangular or triangular. In the illustration the panel 28 is approximately twice the size of the panel 30.

Each panel is made from a flexible plastics sheet material. The panel 28 includes an enclosed region 32 of sheet material which is bounded by an inflatable tubular section 34 which forms a peripheral formation around the panel. The section 34 is formed from the same material as the region 32 and is defined by welding overlapping portions of the sheet material to one another. A valve 36 which is of a kind known in the art is welded to the sheet material of the peripheral formation at a suitable location. The valve 36 could be of a type which can be used for inflating or deflating a tubular section 34, according to requirement. Alternatively two valves (not shown) could be used: one for inflating, and one for deflating, the tubular section when required.

The panel 30 has a construction similar to that of the panel 28 and for this reason is not further described herein.

FIG. 4 is an enlarged view of a portion of the arrangement shown in FIG. 3 marked A. A fastener 10, of the type shown in FIG. 1, is used to secure the panels together. Once the peripheral formations of the panels have been inflated, the panels take up their designed shapes and are fairly rigid. In the example adjacent portions 34A and 34B of the peripheral formations 34 on the respective panels are positioned alongside one another and the fastener 10 is then engaged with the peripheral formations at selected locations. The arcuate formations 12 and 14 are clipped around the inflated tubular formations 34A and 34B with the central region 16 fitting between the formations. When the fastener is engaged with the tubular formations, the tubular formations are slightly deformed or, alternatively, the arcuate sections 12 and 14 are slightly deformed outwardly so that the tubular formations can fit closely into the arcuate sections 12 and 14 respectively. As each arcuate section extends through more than 180° it tends to stay in position once it is engaged with a tubular formation and the fastener is only detachable from the tubular formations if a pulling force is exerted on the fastener.

Important aspects in this regard are the size of the mouth 24 (in an angular sense) and the fact that the central region 16 is relatively short and linear. It has been found that it can be difficult to connect two tubular sections to a fastener 10 if the central region 16 is extended in an arcuate sense along the circular paths which define the sections 12 and 14 respectively. As the kit of the invention is intended to be used, at least, by children the ease of connecting the panels to, and disconnecting the panels from the fastener is an important factor.

Figure 5:
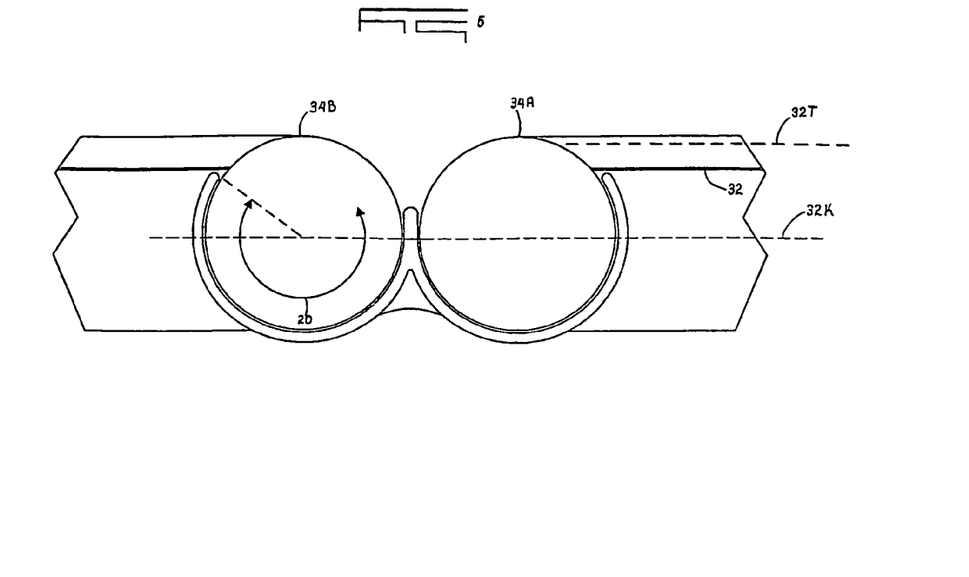
FIG. 5 is a plan view in cross-section of the arrangement shown in FIG. 3 taken on the line 5—5.

FIG. 5 illustrates the tubular formations 34A and 34B in plan and in cross section. Each arcuate section 12 and 14 extends through the respective angle 20 which, as noted, is well in excess of 180°. The arcuate sections therefore remain firmly engaged with the peripheral formations 34A and 34B provided these formations are fully inflated. It is clear that the positions at which the region of sheet material 32 is attached to, and projects from, a tubular section 34 is important for this factor influences the shape of the fastener 10.

In FIG. 5 the region 32 projects from the tubular section 34 at a point which is adjacent the respective end 18. If the region were "centrally" positioned relatively to the tubular section 34, as indicated by a dotted line 32K, it would not be possible, by using the described fastener 10, to connect the panels to each other in an in-line arrangement. As is described hereinafter it is possible to construct different fastener arrangements to take account of different types of construction of the panels but by using a correctly designed panel, ie. one in which the region 32 is "off-centre" and close to, or at, a tangential position 32T, and a correctly shaped fastener which is generally of the type shown in FIGS. 1 and 2, the number of different types of components in the kit of the invention can be minimized.

As is shown in FIG. 3 two fasteners designated 10A and 10B are used at spaced locations, in a vertical sense, to secure the panels 28 and 30 to each other.

A plurality of panels of different shapes and sizes can be interconnected to one another, substantially in the manner described, using a plurality of fasteners 10.

Figure 6:
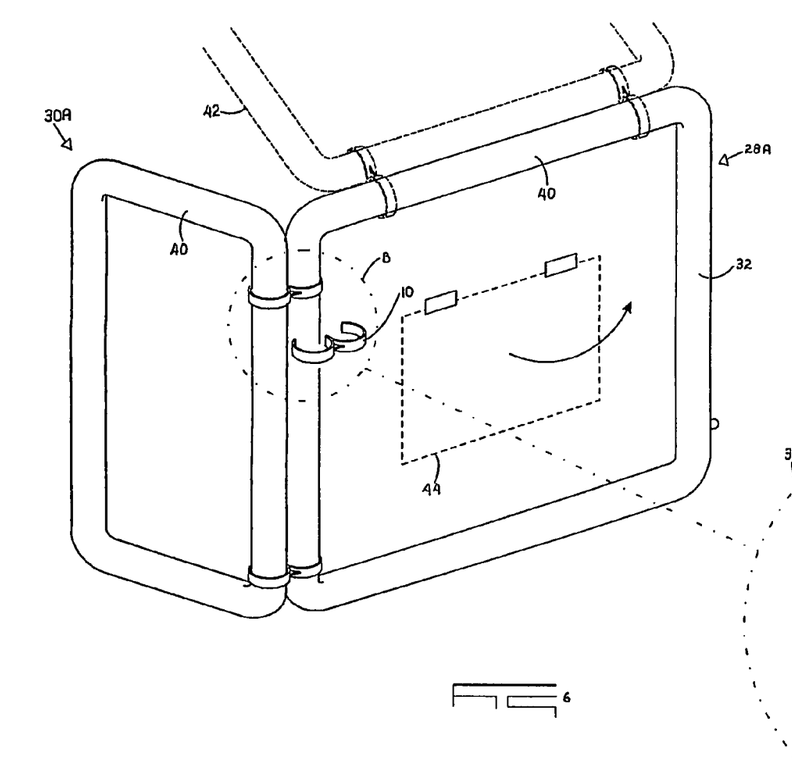
FIGS. 6 and 7 are views similar to FIGS. 3 and 4 respectively but wherein the interconnected panels are at a right angle to each other.
Figure 7:
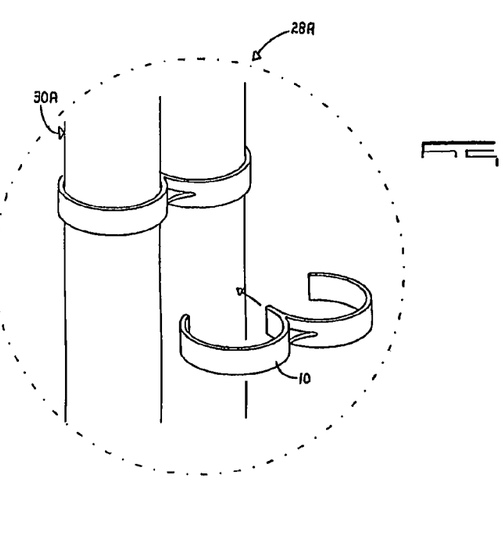

FIG. 6 illustrates panels 28A and 30A respectively which are similar in all material respects to the panels 28 and 30 shown in FIG. 3. In this case however the panels are positioned so that they are at a right angle to each other, when viewed in plan. The panels can however be secured to one another using fasteners 10 in a manner similar to what has been described in connection with FIG. 3. More generally, due to the fact that the peripheral formations 34 are substantially circular in cross-section and as each fastener 10 is formed with two corresponding arcuate sections 12 and 14, it is possible to secure the panels to one another with the panels at practically any desired relative angular orientation, but taking into account the points made in connection with FIG. 5. Moreover it is possible to adjust the panels by turning one panel angularly relatively to another. It is also possible to erect additional panels at elevated positions by engaging the panels with upper horizontally extending sections 40 of the peripheral formations 34. The upper panels can extend horizontally or, as is indicated by means of dotted lines 42 in FIG. 6, can be inclined in the nature of a roof.

The panels 28 and 30 are two panels in a plurality of panels which are carefully chosen in sizes and shapes, to make up a kit. The panels are designed so that they can be secured to one another, according to requirement, to make up a structure of any practical shape and size. If desired the structure can have walls and a horizontal or inclined roof. The enclosed regions 32 of the various panels can be formed from opaque or transparent plastics materials, according to requirement. Thus a portion of a region 32 of a selected panel could, for example, include a transparent section 44 or a section which can be opened to define a window opening. As is shown in FIG. 6 the section 44 can be lifted and can be engaged firmly with the panel, when required, by means of appropriate fasteners e.g. fasteners which are based on interengaging hook and eye formations of the type sold under the name VELCRO.

Although the central region 16 which joins the arcuate sections 12 and 14 together may be rigid it is possible to form this region with a hinge line or a line of weakness using techniques which are known in the art. This enables one arcuate section 12 to be pivoted about the region 16 relatively to the other section 14. For example the region 16 can be formed as a thin pliable coupling component 16A and the remainder of the material of the section 16 is eliminated—see the inset drawing to FIG. 2 which illustrates a flexible link between the sections 12 and 14. A panel which is secured to an adjacent panel by means of a modified fastener of this type can act as a door in that the panel can be pivotally moved relatively to the other panel.

Figure 8:
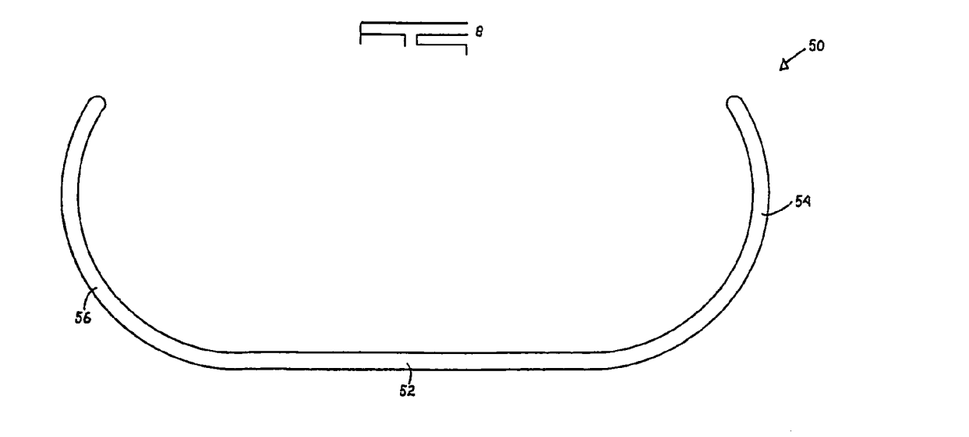
FIG. 8 is a view in plan of a fastener according to a different form of the invention which can be used in place of the fastener shown in FIG. 1, and FIGS. 9, 10 and 11 schematically illustrate the use of different types of fasteners.

FIG. 8 illustrates a modified fastener 50 which can be used in place of the fastener 10. The fastener includes a bridging piece 52 with arcuate sections 54 and 56 located respectively at opposed ends of the bridging ends. The arcuate sections have concave surfaces opposing each other. Each section 54, 56 is engageable with a respective peripheral tubular formation 34 of the kind shown in FIGS. 3, 4, 6 and 7. The fastener 50 does not have an intermediate region 16 between the arcuate formations 54 and 56. A significant feature which flows from this difference is that it is not possible to connect the fastener 50 to a single peripheral formation 34 for it can only be engaged simultaneously with two peripheral formations 34 which are side by side. Clearly with a fastener 10 of the kind shown in FIG. 1 each arcuate section 12, 14 can be engaged with a peripheral formation 34 and it will remain engaged with the peripheral formation irrespective of whether the other arcuate section is engaged with a peripheral formation.

Figure 9:
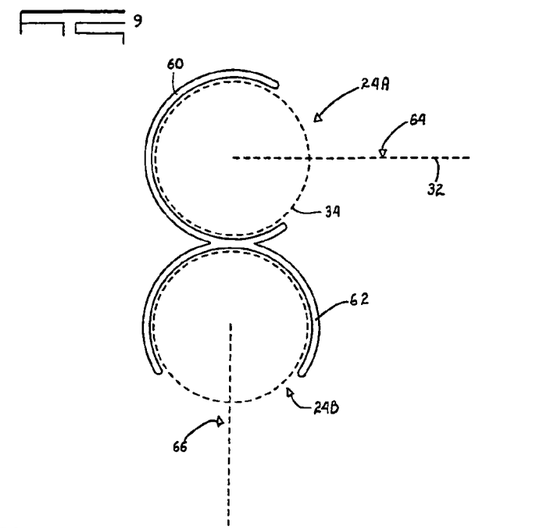
Figure 10:
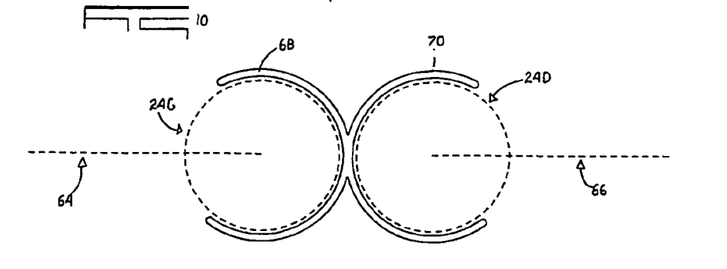
Figure 11:
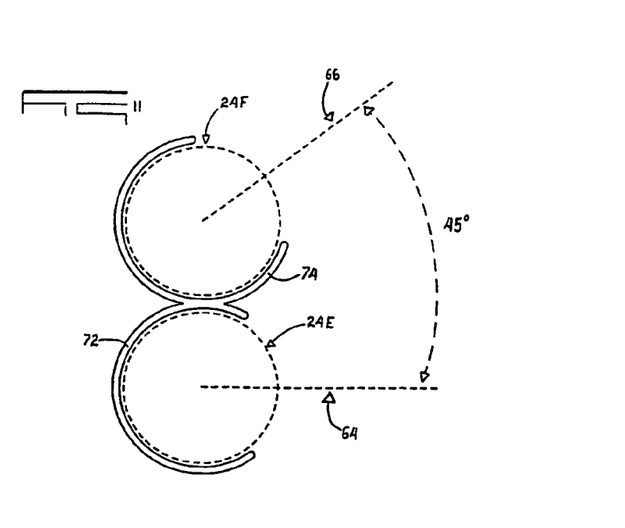

FIGS. 9, 10 and 11 are schematic representations in cross section and plan of different types of fasteners and panel arrangements.

FIG. 9 illustrates two C-shaped clips 60 and 62 respectively which have mouths 24A and 24B respectively positioned to face at a right angle to one another. A panel 64 with a tubular formation 34 and a "centrally" positioned region 32 is engaged with the clip 60 while a second panel 66, of similar construction to the panel 64, is engaged with the clip 62. The panel 66 is at a right angle to the panel 64. Although it is possible to vary the relative orientations of the panels, to a considerable extent, it is not possible to align the panel so that the regions 32 of the panels are in line with each other.

FIG. 10 shows a fastener with arcuate clip formations 68 and 70 respectively which have mouths 24C and 24D respectively which face in opposite directions. Panels 64 and 66, similar to what has been described in connection with FIG. 9, can be connected to the fastener in an in-line configuration but it is evident that the panels cannot be arranged so that they are at a right angle to one another.

FIG. 11 shows a fastener with a C-shaped clip formation 72 secured at an "angle" to a second C-shaped clip formation 74. Thus the formation 72 has a mouth 24E whereby a panel 64 can be connected to the clip formation and the clip formation 74 has a mouth 24F positioned so that a panel 66, which is connected to the clip formation 74, extends at an angle of about 45° (viewed in plan) to the panel 64.

It is clear from a consideration of the constructions shown in FIG. 5 and FIGS. 9 to 11 that there is an important interrelationship between the shape of the fastener or fasteners and the shapes of the panels with which the fastener or fasteners are to be used. To reduce the component count the fastener should preferably be of the type shown in FIGS. 1 and 2 and the construction of a panel should be similar to what is shown in FIG. 5. The scope of the invention is however not confined to these particular configurations for other configurations may be employed although, generally, this would be at the expense of an increased component count.

A plurality of panels of the kind described are provided, in deflated form, together with a plurality of fasteners 10 to make up a building kit. At the time of usage the user inflates the tubular sections of selected panels. When the tubular peripheral formations are inflated the panels take up their desired shapes and sizes. The panels can then be connected to one another. The panels are readily disassembled and can be deflated for storage or transport purposes.

It is envisaged that the building kit of the invention will be used particularly by children to make structures, shelters and the like. The panels are lightweight and safe to use and the likelihood of a child being injured when using the panels is remote. Obviously the panels do not possess sufficient strength to render them load-bearing.

Another application which falls within the scope of the invention is to make use of a building kit of the kind described to erect a shelter for example as a wind or sun shelter. This type of structure can be used, for example, on the beach in place of a beach umbrella.

The panels can in fact be connected to one another in an arbitrary configuration or shape. A number of panels may be coupled to one another to form a maze or a tunnel-type structure and panels can be positioned adjacent a wall so that a shelter or enclosure is provided by a surface of the wall in combination with the panels.

The use of the kit of the invention is not confined to educational or play devices for children. It is possible, for example, to make use of the kit of the invention to provide an easy to erect display assembly which can carry advertising, signage, logos or the like for example for use at an exhibition or demonstration, whether indoors or outdoors.

The panels and clips can be made to any appropriate size so that structures which are made from the kit can also be of an appropriate size.

The invention claim is:

1. A kit for building a structure which includes a plurality of panels,
   wherein each panel is made from flexible sheet material having at least one respective peripheral formation which is formed by an inflatable section of the sheet material and a plurality of fasteners to secure the panels together,
   wherein each panel includes a region of flexible sheet material and an inflatable tubular section of sheet material which extends around the region to form a continuous peripheral formation of the panel,
   wherein each fastener includes a body which is made from a resiliently deformable plastics material and which is formed with two arcuate sections which respectively define clip formations, and
   wherein the clip formations of a fastener are respectively engageable with the peripheral formations of two of the panels which are positioned adjacent each other, to secure the panels together.

2. A kit according to claim 1, wherein, in each panel, the region extends from the inflatable tubular section at a location, which viewed in plan and cross section, is off-center.

3. A kit according to claim 2, wherein, in each fastener, the arcuate sections are joined to each other at a central region.

4. A kit according to claim 2, wherein, in each fastener, each arcuate section extends along a substantial portion of a circular path through an angle in excess of 180°.

5. A kit according to claim 1, wherein, in each fastener, the arcuate sections are joined to each other at a central region.

6. A kit according to claim 5, wherein the central region is linear.

7. A kit according to claim 6, wherein each arcuate section defines a mouth between an end of the arcuate section and an end of the central region.

8. A kit according to claim 6, wherein, in each fastener, each arcuate section extends along a substantial portion of a circular path through an angle in excess of 180°.

9. A kit according to claim 5, wherein each arcuate section defines a mouth between an end of the arcuate section and an end of the central region.

10. A kit according to claim 9, wherein the mouth extends in an angular sense through an angle which is less than 120°.

11. A kit according to claim 10, wherein, in each fastener, each arcuate section extends along a substantial portion of a circular path through an angle in excess of 180°.

12. A kit according to claim 9, wherein, in each fastener, each arcuate section extends along a substantial portion of a circular path through an angle in excess of 180°.

13. A kit according to claim 5, wherein, in each fastener, each arcuate section extends along a substantial portion of a circular path through an angle in excess of 180°.

14. A kit according to claim 1, wherein, in each fastener, each arcuate section extends along a substantial portion of a circular path through an angle in excess of 180°.

* * * * *